July 7, 1953  W. S. SCULL 2ND., ET AL  2,644,681
APPARATUS FOR ROASTING VEGETABLE MATERIALS
Original Filed April 8, 1947  3 Sheets-Sheet 1
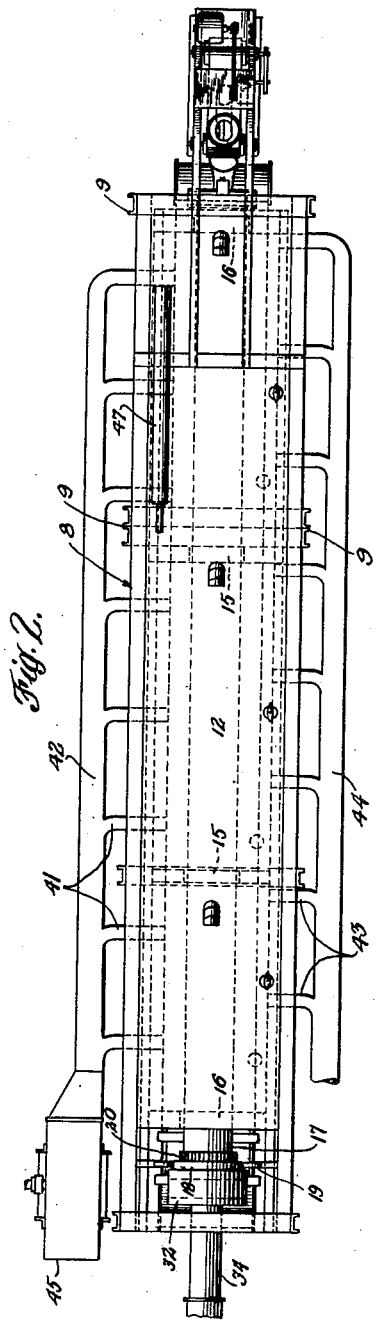
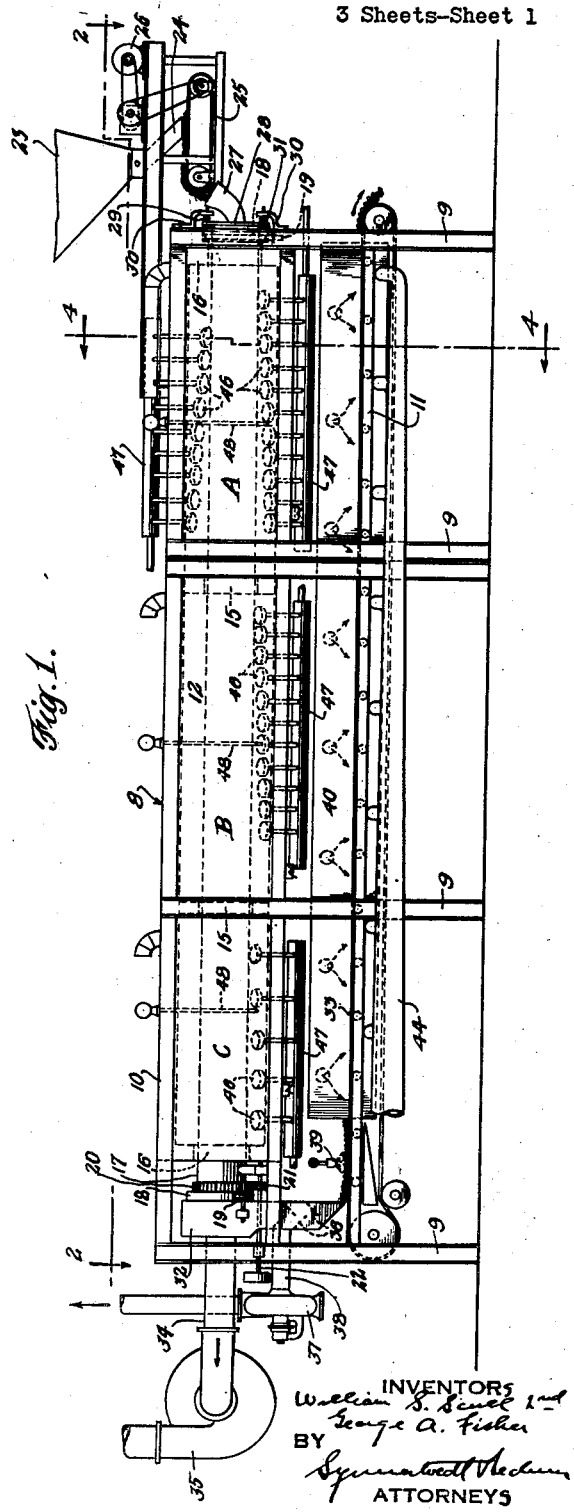
INVENTORS
William S. Scull 1st
George A. Fisher
BY
ATTORNEYS

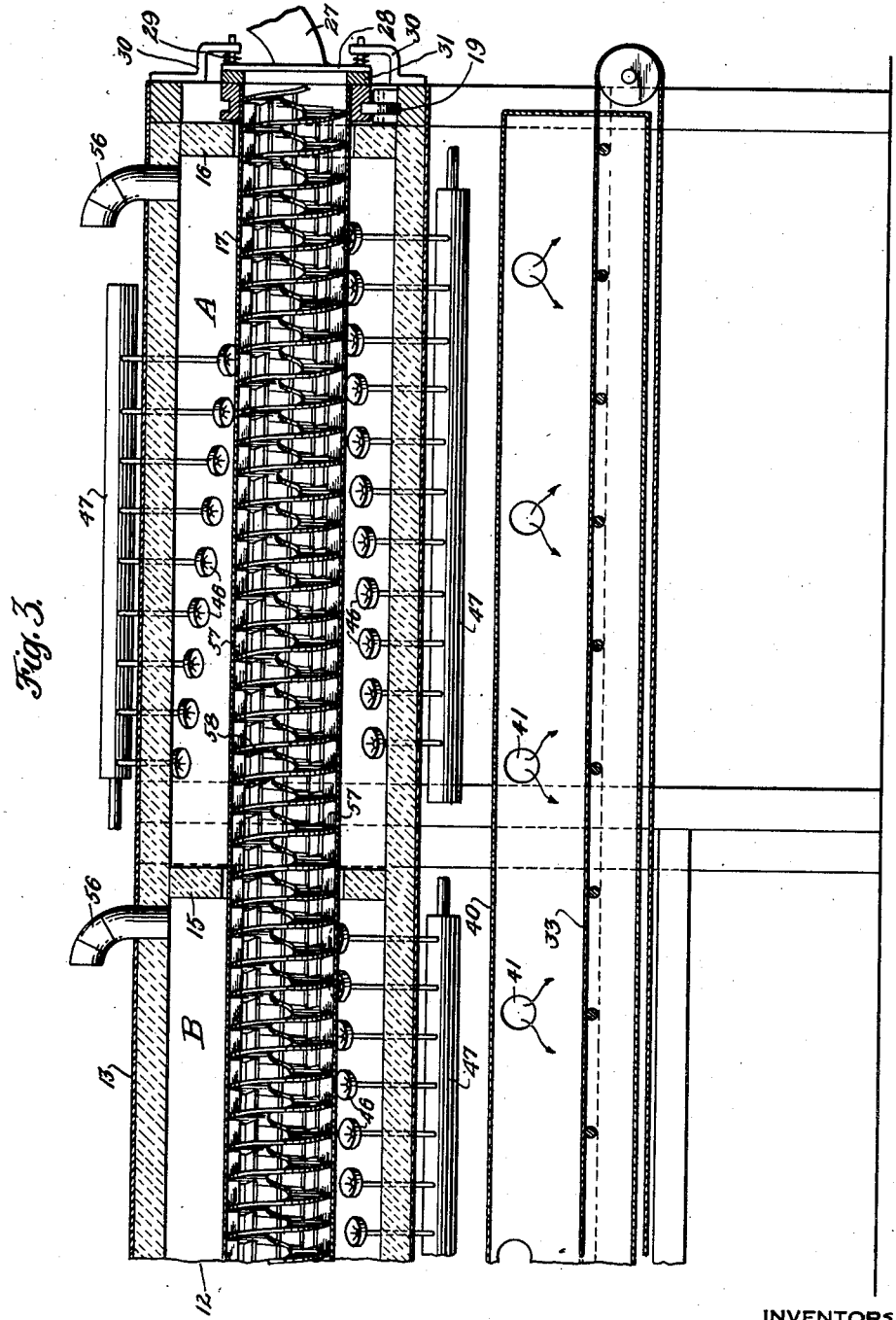

July 7, 1953 W. S. SCULL 2ND., ET AL 2,644,681
APPARATUS FOR ROASTING VEGETABLE MATERIALS
Original Filed April 8, 1947 3 Sheets-Sheet 3

INVENTORS
William S. Scull 2nd
George A. Fisher
BY
ATTORNEYS

Patented July 7, 1953

2,644,681

UNITED STATES PATENT OFFICE 2,644,681

APPARATUS FOR ROASTING VEGETABLE MATERIALS

William S. Scull 2nd, Bryn Mawr, and George A. Fisher, Selinsgrove, Pa., assignors, by mesne assignments, to Jabez Burns & Sons, Inc., a corporation of New York Original application April 8, 1947, Serial No. 740,156. Divided and this application May 5, 1948, Serial No. 25,234

4 Claims. (Cl. 263—34)

Our invention has to do with a process and apparatus for roasting vegetable materials such as coffee, nuts, beans and the like, and is particularly useful for roasting coffee as this commodity is one of the most difficult to roast successfully with uniform high quality.

The process is the subject of our application Serial No. 740,156, filed April 8, 1947, now Patent No. 2,581,148 the roasting apparatus being the subject of the present divisional application.

In the description of our invention, we have therefore referred specifically to the roasting of coffee. It will be understood, however, that the apparatus is readily adaptable to the roasting of other vegetable materials which do not require the careful control needed for roasting coffee.

As coffee is roasted on a commercial scale today, it has been found difficult to get a uniform high quality roast and this is the case whether the coffee is roasted by the batch or continuously.

It is the primary object of our invention to provide a novel form of apparatus for roasting coffee which will produce roasted coffee of uniform high quality by a continuous process and on a commercial scale.

This we accomplish by providing an apparatus by means of which the coffee may be roasted in a conditioned atmosphere and with control of the processes in all stages which can be so carefully adjusted that the desired uniform high quality results will be assured.

Fundamentally, there are two stages in the roasting of coffee: first, the dehydration stage and, second, the actual roasting or development stage.

The green coffee beans normally contain up to about 20% moisture. In the dehydration stage, the heating of the beans drives off the greater part of the moisture and certain chemical changes take place. In the roasting or development stage the dehydrated beans undergo further chemical changes and it is well known in the art that the addition of the last 10% of the heat must be carefully controlled in order to obtain uniform high quality flavor.

As a matter of fact, the matter of a few seconds at the end of the roasting stage will produce such a marked effect on the quality of the coffee that we believe it preferable to regard the final heat input period as a separate stage in the coffee roasting process and, for that reason, we treat the roasting as a three-stage process. We call the first the dehydration stage; the second the development stage; and the third the "explosive" and "coloring" stage.

It is known that the coloring stage is critical in producing coffee of good quality and uniformity of flavor and it is known that in any particular time-temperature roasting cycle with a given grade of coffee the production of coffee of a uniform color results in the production of coffee which will yield uniform cup quality. During the dehydration and development stages, it is estimated from experiment that about 90% of the heat required may be added to the coffee and still not materially darken the color. It is the addition of the last 10% of the heat which substantially affects coloring and thus the ultimate flavor of the coffee.

Accurate control of the coloring stage in the roasting process is therefore one of the important factors in any successful roasting process, and it is one of the objects of our invention to provide apparatus wherein this accurate control can be secured.

In the dehydration stage, the heating of the beans drives off the greater part of the moisture and certain chemical changes take place.

We believe that chemical changes which take place in the dehydration zone are of greater importance than has hitherto been recognized and we have discovered that a high and rapid heat input in the dehydration zone produces a coffee of much better flavor than that secured if the dehydration is carried out slowly at low temperature. It is our opinion that the improved flavor results because the chemical changes which occur in the dehydration zone take place while moisture is still present in the coffee beans and it is known in many food treating processes that the presence or absence of moisture will have a marked effect on the results secured.

Another factor which we consider to be of the greatest importance is the atmosphere in which the coffee is roasted. We have found that a much improved flavor will be secured if the coffee is roasted under conditions (1) in which air and the gaseous products of combustion are not allowed to come into contact with the coffee and (2) the roasting is carried out in an atmosphere consisting of the gases evolved during the roasting process. It is, therefore, a further object of our invention to provide roasting apparatus in which such conditions prevail.

In this connection it should be stated that it is not necessary or practical to exclude all of the air from the roaster as a small amount will come in with the coffee beans. However, the amount of air coming in with the beans will not be great and if air is otherwise excluded the desired results will be achieved.

We have also found that it is possible and desirable to carry out the process rapidly, not only because this increases the output of the roasting apparatus but also because there will be considerably less shrinkage loss and less loss of volatiles.

Also, in slow roasting, the coffee will increase in size very slightly, whereas in rapid roasting the increase in size or development is such that the coffee will practically double in volume. This is because with rapid roasting in the final stages the beans will explode or break open due to the internal pressure, whereas with the slower roasting this final explosive stage may not be reached and it has been found that the quality of coffee which is fully developed by a rapid roast is much superior to that which has not substantially increased in volume.

Our improved process, in certain stages, can be carried out in different ways, but we have found that in any case in the first stage of the roasting (i. e. the dehydration stage), it is desirable that the coffee be subjected to a high temperature first to substantially dehydrate it and generate steam in order to exclude air from the roaster and provide conditioned atmosphere in which other steps of the process can be carried out and, second, to accelerate the chemical reactions which take place in the presence of the moisture in the beans.

However, in the development and roasting stages, the time-temperature relationship can be varied in order to provide short time, high temperature condition or longer time, lower temperature conditions.

For example, the coffee can first be subjected for a predetermined period of time to a high temperature for reasons above set forth. The coffee can then be subjected to a lower temperature for substantially the same period of time in order to develop it and finally subjected to a lower temperature for substantially the same period of time in order to color or finally develop the beans. However, if desired, the beans can be completely roasted in three stages where the temperature is maintained substantially the same in each stage. If this is done, however, it is necessary that the time factor be changed so that the beans are subjected to the heat in the second stage for a substantially less period of time than in the first and are subjected to the heat in the third stage for much less time than in the process first described. Securing the proper heat input in each stage of the roasting is the controlling factor.

In general, we prefer to carry out our improved process in a roaster in which the coffee is heated in each stage of the process for the same length of time but at progressively lower temperatures in each stage.

In the coffee roasting art, another problem which is met is in roasting blends of coffee. This is due to the different moisture content of the beans of different blends and to differences in size and other characteristics. It will be understood that when beans of different moisture content, size, etc., are roasted together, especially in a continuous process, the total heat input requirement will vary for the different coffees, and, unless a provision is made for overcoming the difficulty, beans of one coffee will be roasted to a different degree than beans of another coffee. Sometimes each coffee is roasted separately and the blending done after the roasting.

However, there are certain advantages in roasting a blend after the various coffees comprising the blend have been mixed together and in such case it has been the practice, where a continuous process is to be used, to first "condition" the beans in order to secure uniformity of the moisture content in the various coffees to be roasted. This conditioning is accomplished either by storing the blended coffee in silos, generally for several weeks, or by maintaining it at a low temperature over a period of time. In many commercial roasters using the batch process, good results are secured in roasting blends without conditioning, apparently because the coffee is treated in such large masses and in such close contact that the moisture of the beans appears to equalize during the roasting process and there is, therefore, no need for conditioning. So far as we are aware, however, it has heretofore been impossible to roast blends in a continuous process without preconditioning the coffee.

It is a further object of our invention to provide an improved apparatus for continuous roasting of coffee in which it is possible to roast a blend without preconditioning.

In the accompanying drawings, we have illustrated two forms of apparatus for carrying out our improved process.

Figure 1 is a side elevation of one form of our improved roaster;

Figure 2 is a plan view of the roaster illustrated in Figure 1, taken on the line 2—2 of Figure 1;

Figure 3 is an enlarged sectional elevation of the first and a portion of the second of the roasting compartments of the roaster illustrated in Figure 2;

Figure 4:
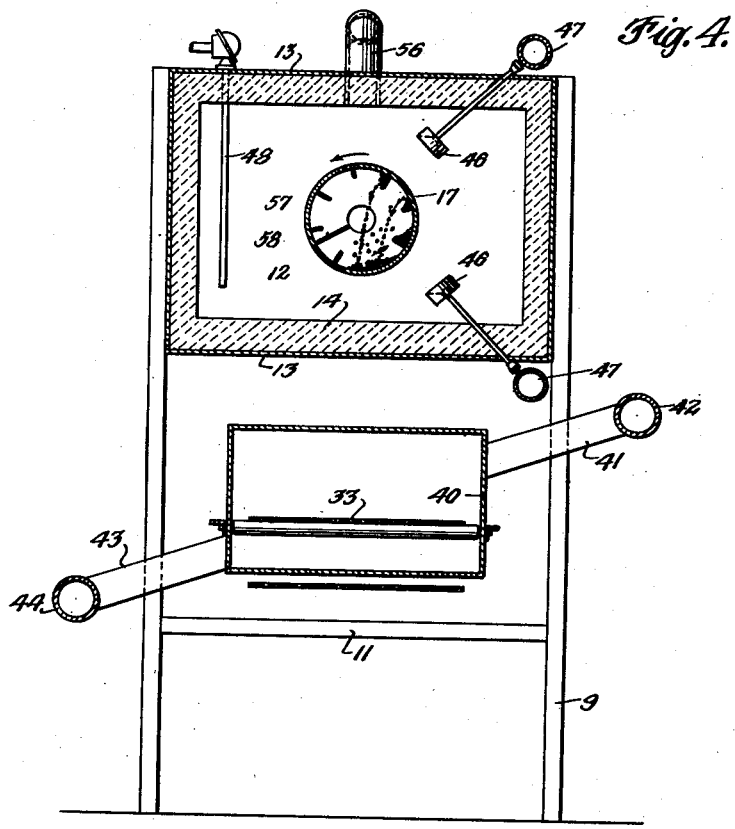
Figure 4 is a section taken along the line 4—4 of Figure 1.
Figure 5:
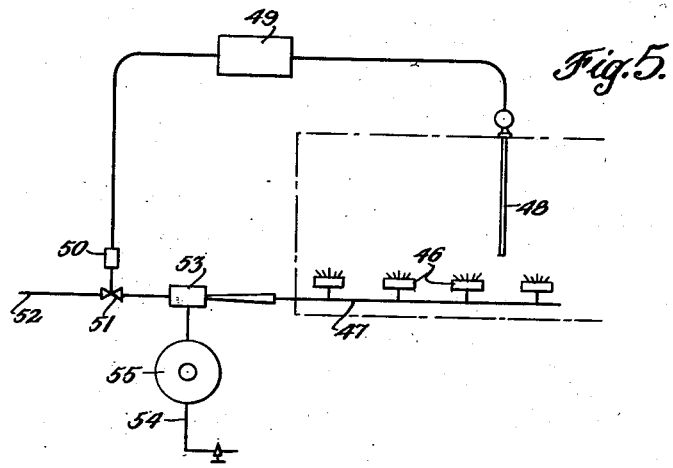
Figure 5 is a diagrammatic illustration of the control mechanism for the fuel supply to the burners for the various zones of the roaster.

Referring now to Figure 1, the roaster is supported in the frame 8 which consists of upright channel members 9 which support the horizontal frame members 10 and 11.

The oven 12 comprises a sheet metal casing 13 which is lined with refractory insulation 14 which can conveniently take the form of magnesium blocks. The oven is divided lengthwise into three roasting compartments—A, B and C—by refractory partitions 15 and is closed at the end by refractory walls 16. The roasting tube 17 extends from one end of the oven to the other and at either end is provided with a head 18 from which the tube as a whole is supported. The head 18 is mounted for rotary movement on trunnions 19 and the head at one end is driven by means of ring gear 20 which is driven by the gear 21 carried by drive shaft 22 which is driven by a motor (not shown) from a convenient location on the floor or in the frame.

Coffee is fed to the inlet end of the tube from the hopper 23. From this hopper the coffee flows through the spout 24 to endless belt 25 which is driven by means of motor 26 through appropriate belts and pulleys. From the endless belt 25, coffee is delivered into a feed spout 27. To the end of the spout, adjacent the tube, there is welded a flange or ring 28 which is the same diameter as the tube. The purpose of this flange is to close the end of the tube. The flange is held against the end of the tube by means of springs 29 which are supported by brackets 30. Between the ring and the end of the tube there is located a brass friction disc 31 which is carried by the ring 28.

At the outlet end of the tube the head 18 opens into a dechaffing box 32 through which the coffee falls to a wire mesh conveyor belt 33. The exhaust pipe 34 extends into the dechaffing box 32 opposite the end of the tube 17. Gases from the tube are exhausted through the pipe 34 by means of the fan 35. The dechaffing box is provided between the delivery end of the tube 17 and the conveyor belt 33 with a plurality of baffles 36 onto which the coffee falls. Air is drawn through the outlet end of the dechaffing box by means of exhaust fan 37 which is connected to the dechaffing box by the pipe 38.

On leaving the end of the tube 17, the coffee will fall onto the baffles 36 through the countercurrent of air drawn through the lower end of the dechaffing box and the coffee beans in striking the baffle plates and rubbing together will be thoroughly scrubbed of all chaff in the dechaffing box by means of the countercurrent of air which is drawn therethrough. The chaff, being much lighter than the coffee bean, is carried out through the exhaust pipe 38 while the beans continue to fall under the conveyor belt 33.

After leaving the dechaffing box the coffee is carried beneath the water spray 39 which serves the purpose of quenching the coffee and checking the roasting process. After passing beneath the spray, the coffee is carried into the air-cooling box 40 where a current of air is circulated through the coffee on the conveyor. The air is blown into the box through the inlet pipes 41 which are connected to the manifold 42 which, in turn, is connected to blower 45, there being several of these inlet pipes 41 throughout the length of the box.

In the box the air builds up a slight positive pressure above the coffee, gradually filters down through the coffee, thus cooling it, and is forced out through outlet pipes 43 which are connected to the outlet manifold 44.

The conveyor is driven from the same motor which drives the roasting tube.

At the delivery end of the belt, the coffee is collected in suitable containers for further processing.

Each of the various compartments of the oven is heated by a plurality of radiant gas burners 46 extending in line lengthwise of the tube. As it is desired to heat compartment A to a high temperature, there are two sets of burners in this compartment. In compartment B there is but one set of burners and in compartment C likewise there is one set of burners considerably less in number than in compartment B. The burners of each compartment are connected to gas-air manifolds 47 and the amount of gas-air mixture flowing into the manifolds is controlled in the following manner.

Thermo-couple 48 is located in the mid-section of the compartment opposite the burners. This thermo-couple 48 is connected to the indicating and control device 49 which indicates and records the temperature of the particular compartment in which the thermo-couple is located and in addition controls the actuating mechanism 50 of valve 51 which regulates the amount of air flowing through line 52 into the inspirator 53. Gas is supplied to the inspirator 53 through the line 54 through pressure regulating valve 55 and the amount of gas drawn into the line will depend upon the amount of air passing to the inspirator in accordance with the adjustment to which the inspirator is set. From the inspirator the gas-air mixture passes to the manifold 47 and from thence to the burners 46. As the control for each compartment is the same, the foregoing description will apply to each of them.

It is to be noted that in each of the compartments, the burners toward the inlet end are located in close proximity to the tube and taper in each compartment to a position further and further away from the tube. This arrangement of the burners is provided in order to give some equalization to the heat at opposite ends of the compartment and the thermo-couple is located intermediate the ends in order to secure operation thereof at the mean temperature of the compartment.

Each of the compartments is provided with an outlet pipe 56 through which the products of combustion escape. If desired, there can also be a damper control opening (not shown) in each of the compartments in order to admit a small amount of air to prevent pressure of the gaseous products of combustion building up in the compartments.

On the inside the tube is provided with a ribbon-like helical member 58 extending from one end of the tube to the other. In addition to the helix, the inner wall of the tube is provided with a plurality of longitudinal strips 57 or baffles also running from one end of the tube to the other.

When the assembly is in position in the tube, the helix is welded to the tube either by spot welding or by a continuous weld. It is preferable that the weld be continuous as heat is then conducted to the entire surface of the helix much more effectively than if spot welding is used. However, we have found that it is perfectly practical to operate the roaster with the parts being spot welded and this is especially true if the fit of the helix within the tube is a tight one.

The coffee is roasted in the following manner. Coffee is fed from the hopper 23 through the spout 24 to the belt 25. The belt 25 delivers the coffee to the spout 27 and it is of great importance that the speed of the belt be uniform and subject to accurate control, as it is the speed of the belt which determines the amount of coffee which is delivered to the roaster.

On entering the tube, the coffee is picked up by the longitudinal strips and moved upward, in a clockwise direction, as viewed in Figure 4. As the strips move upwardly, the beans fall from them by gravity down to the bottom of the tube where they are picked up again by one of the strips and again moved upwardly. The speed of rotation of the tube should not be so great that centrifugal force will prevent the beans dropping by gravity from the strips before they reach the uppermost part of the path of revolution. If the tube is rotated too rapidly, in some cases the beans will be held by centrifugal force against the wall of the tube and will not drop at all. In other cases, with a less rapid rotation, the beans might be carried past the top of the path of revolution and dropped, but in this case they would drop on the wrong side of the helix and again would not move forward. It is therefore important that the speed of rotation be adjusted so that the beans will be moved forward as the tube is rotated.

In the process of rising and falling within the tube, as they are carried forward, the beans will be brought into and out of contact with the wall of the tube, the helix 58 and the longitudinal strips 57, and when in contact with these parts will be heated by the heat conducted through the tube as well as by radiation. When dropping they will be heated by radiant heat of the parts and the continued relatively violent agitation insures that none of the beans will remain in one position long enough to be burnt. The agitation also insures intimate mixture and contact of the beans one with the other which, for a reason to be pointed out hereinafter, is of especial value in the roasting of coffee blends.

It will be observed that as the coffee moves through the tube, it is heated in three stages or zones corresponding to the compartments A, B and C of the oven, and it will further be observed that the design of the helix is such that the coffee will move through each zone at the same rate of speed. In other words, the coffee is exposed to the heat in each zone for the same length of time.

In compartment A, the tube is heated at a temperature ranging between 600° and 1200°, in the final zone to a temperature ranging between 300° and 650°, and in the middle zone to a temperature substantially midway of the temperature to which the first and third zones are heated. The roasting time can vary between 70 seconds and six minutes depending on the temperature of the tube and rate of feed of coffee to the tube.

It will be understood, of course, that the roaster can be used to roast coffee in the conventional roasting time of about eighteen minutes with improved results due to the conditioned atmosphere in which the roasting takes place. However, the rapid roasting of the coffee which is possible with our roaster is much more preferable.

It is to be observed that the heating of the beans in the tube is done indirectly, that is by contact with the wall of the tube, the helix and longitudinal strip and also by radiation from those elements. Products of combustion or flames do not come in contact with the coffee beans and the steam and other gases evolved from the coffee during the process prevent the entrance of any air. The process may therefore be said to be carried out in an atmosphere consisting substantially solely of the gases evolved during the process. As was pointed out above, it is probable that a small amount of air enters the tube with the beans but this amount is so insignificant that for practical purposes it can be disregarded.

By varying the speed at which the tube is rotated, the speed at which the coffee is moved throughout the tube can be varied and, therefore, by controlling the speed of rotation of the tube and the temperature of the different compartments, a very accurate control of each stage of the roasting process is secured. In general, in order to roast rapidly, we prefer to maintain the temperature of the tube in the first zone at about 1000° F.; in the second zone at about 800° F.; and in the third zone at about 600° F., with a total roasting time of three and one-half minutes, the coffee therefore being exposed to the heat in each zone for approximately one minute and ten seconds.

It is quite possible, however, to secure excellent results within the ranges of temperature which I set forth previously and with certain coffees it may be found that other temperature-time conditions within the ranges given will be desirable.

In the roasting process, due to the high heat input into the coffee in compartment A, the coffee is rapidly dehydrated and steam is generated. The steam and other gases which are generated in the first zone of the apparatus are drawn through the tube toward the exit end by means of the exhaust fan 35. It is to be observed, however, that this exhaust fan is run at a speed sufficient only to remove gases generated in the process as they are evolved and the speed of rotation of the fan should be such that there is a slight positive pressure throughout the length of the tube. This slight positive pressure throughout the tube will prevent the entrance of any air into the tube from either end and it is our general practice in roasting to so regulate the speed that a slight amount of steam will escape at the inlet end of the tube, thus preventing any air being introduced into the tube excepting that which is entrained with the stream of beans or within the beans themselves. In the second or development zone the coffee undergoes further chemical changes which result in converting the starches, proteins and other constituents in the coffee to the materials responsible for the coffee flavor, body and aroma. Volatiles are also liberated from the coffee in this zone and form part of the atmosphere in which the roasting in the second and third zone is carried out. It is desirable, however, that the liberation of the volatiles from the coffee be held at a minimum and this is one of the reasons why we prefer to carry out the roasting in the second zone at a temperature as low as possible for the time allowed.

On leaving the development zone, the coffee next passes to the coloring zone where the temperature is substantially lower than in the development zone and in this zone the coffee is given its final color. It will be borne in mind that in both the development and coloring zones the roasting of the coffee is carried out in the presence of the steam and other gases evolved from the beans in the dehydration zone. In the development and coloring zones, gases evolved from the roasting will also be present. Just what effect the presence of these gases has we are unable to state; however, it is our belief that the presence of these gases plays a great part in the improved flavor developed.

One point which should be noted in connection with the roasting process is that the temperature of the coffee never falls during the process in spite of the fact that the temperature in the second and third zones is progressively lower than in the first, and the regulation of the temperature in the different zones should never be such as to permit any lowering of the temperature in the coffee from the time the roasting process begins until the end.

One factor which must be taken into consideration in a roasting process is the rate of feed of the beans. If too many beans are fed into the tube, the mass of beans at any particular point in the tube will be so great that all of the beans do not come into contact with the tube walls or at any rate would contact the tube walls only occasionally. Uneven roasting of the beans naturally results. We have found that it is desirable to feed the beans at such a rate that substantially all of the beans which are dropped to the bottom of the tube will be picked up by the longitudinal strips as they move upwardly from the bottom of the path of revolution. In other words, the mass of beans at the bottom of the tube at any particular point is not sufficiently great to bury the longitudinal strips and cross-sectionally considered the beans occupy a relatively small amount of the space within the tube. Figure 4 illustrates in general the distribution of beans in the tube.

There would be no particular lower limit as to the amount of beans fed in any particular period of time insofar as the roasting of the beans is concerned. However, from a practical point of view it is obviously desirable to roast as great a quantity as possible in any particular period of time.

It is also to be observed that the rate of feed of the beans will have some effect on the amount of heat required and, therefore, if the rate of feed is varied, appropriate variation will also have to be made in the heat input into the roaster. We may say by way of example that in a roaster having an eighteen foot tube of ten inch diameter (the general proportion of dimensions of the apparatus illustrated in the drawings), we have found it practical to roast between 350 and 500 pounds of coffee per hour with the rate of feed being such that there are twenty-six pounds of beans in the tube at all times, the variation in output between 350 and 500 pounds, depending on the speed of rotation of the tube.

In order to determine the color of the beans, we have used a colorimeter adapted to distinguish variations of shade between a slightly colored or slightly brown bean to a bean of a very deep brown color, with the mid point of the range being the desired coffee color. The colorimeter is calibrated into ten divisions and we have found that with out improved process and apparatus it is possible to hold the color of the roasted coffee within one-half degree of calibration. The variation in shade of a half degree of color is almost impossible to distinguish with the human eye and in conventional coffee roasting apparatus even the most expert coffee roasters are unable to maintain any such degree of color uniformity due to varying factors which affect the eye in determining color.

In the apparatus above described, it will be observed that the oven is divided into three distinct compartments which are heated to successively lower temperatures from the inlet to the outlet end of the roasting tube. In the arrangement described and illustrated, it is therefore possible to provide three distinct heating zones or stages for the coffee passing through the tube and this is the preferable method of roasting. It will be understood, however, that it would be possible to increase the number of the compartments so as to provide a greater number of heating zones or the oven could have a single compartment with the tube heated by any means providing a diminishing heat from inlet to outlet end, e. g., by providing a large number of burners at the inlet end with the number of burners decreasing toward the outlet end.

We prefer the use of the three-compartment oven as it provides better control of the heat in each stage of roasting as compared to an uncompartmented oven and, as compared to an oven having a greater number of compartments because three compartments are sufficient to secure optimum results and the cost of the oven is less.

When employing the apparatus and proceeding as first above described, optimum results are obtained; but we believe that we are the first to provide a single imperforate and substantially closed, elongated, relatively small diametered heating tube through which the beans are advanced and successively dehydrated, developed and colored, in a relatively small advancing stream, cross-sectionally considered, substantially solely in the presence of the vapors and gases evolved from the coffee beans, and therefore, in its broadest aspects, our invention is not to be limited to the employment of a compartmented oven as hereinbefore described.

We claim:

1. A coffee roaster comprising an oven having a plurality of successive heating zones, heating means to heat said zones to successively lower temperatures, a roasting tube having air-tight unvented walls to prevent the passage of any air into the tube and to roast the coffee beans in an atmosphere of gases evolved during the roasting processes, said walls having at one and the same end of the tube a discharge and exhaust outlet to remove gases evolved during the roasting process and discharge the roasted coffee beans and at the other end a sealing closure provided with a coffee bean inlet tube adapted to be sealed by entering coffee beans to reduce the entrance of air to small quantities unaffecting the coffee roasting and maintaining it substantially solely in the presence of the vapors and gases evolved from the coffee beans, means to rotate said tube, and a coffee bean advancing helix within said tube to advance the coffee beans therethrough from the high to the low temperature end when the tube is rotated, and exhaust means connected to the discharge and exhaust outlet end of said tube including means sealing the coffee discharge against the entrance of air into the tube whereby gases evolved from the coffee during the roasting process may be drawn from the tube.

2. A coffee roaster comprising an oven having a plurality of successive heating zones, heating means to heat said zones to successively lower temperatures, a roasting tube having air-tight unvented walls to prevent the passage of any air into the tube and to roast the coffee beans in an atmosphere of gases evolved during the roasting processes, said walls having at one and the same end of the tube a discharge and exhaust outlet to remove gases evolved during the roasting process and discharge the roasted coffee beans and at the other end a sealing closure provided with a coffee bean inlet tube adapted to be sealed by entering coffee beans to reduce the entrance of air to small quantities unaffecting the coffee roasting and maintaining it substantially solely in the presence of the vapors and gases evolved from the coffee beans, means to agitate the coffee beans and to advance them through said tube from the high to the low temperature end thereof, and exhaust means connected to the discharge and exhaust outlet end of said tube including means sealing the coffee discharge against the entrance of air into the tube whereby gases evolved from the coffee during the roasting process may be drawn from the tube.

3. A coffee roaster comprising an oven having a plurality of successive heating compartments, heaters for each compartment to heat said compartments to successively lower temperatures, a roasting tube having air-tight unvented walls to prevent the passage of any air into the tube and to roast the coffee beans in an atmosphere of gases evolved during the roasting processes, said walls having at one and the same end of the tube a discharge and exhaust outlet to remove gases evolved during the roasting process and discharge the roasted coffee beans and at the other end a sealing closure provided with a coffee bean inlet tube adapted to be sealed by entering coffee beans to reduce the entrance of air to small quantities unaffecting the coffee roasting and maintaining it substantially solely in the presence of the vapors and gases evolved from the coffee beans, means to rotate said tube and a coffee bean advancing helix in said tube to advance the coffee beans therethrough when the tube is rotated, a housing surrounding the discharge and exhaust outlet end of said tube and having a roasted coffee bean discharge and a gas discharge and an exhaust fan connected to said gas discharge of said housing adjacent the end of the tube including means sealing the coffee discharge against the entrance of air into the tube whereby the gases evolved from the coffee during the roasting process may be drawn from the tube to the outlet end thereof.

4. A coffee roaster as set forth in claim 2 wherein said means to agitate the coffee beans and to advance them through said tube from the high to the low temperature end thereof comprises a helix having its outer edge in contact with the inner surface of the tube and a plurality of longitudinally extending baffles in contact with and spaced circumferentially of the inner surface of the tube.

W. S. SCULL 2ND.
GEORGE A. FISHER.

References Cited in the file of this patent

UNITED STATES PATENTS

| Number | Name | Date |
|---|---|---|
| 888,257 | Passburg | May 19, 1908 |
| 1,439,317 | Maede | Dec. 19, 1922 |
| 1,443,529 | Dworzak | Jan. 30, 1923 |
| 1,519,287 | Woodson | Dec. 16, 1924 |
| 1,793,009 | Phillips et al. | Feb. 17, 1931 |
| 1,890,642 | Edwards | Dec. 13, 1932 |
| 2,033,169 | Zeun | Mar. 10, 1936 |
| 2,262,030 | Meyer | Nov. 11, 1941 |
| 2,439,300 | Olsen | May 23, 1944 |
| 2,461,134 | Arnold | Feb. 8, 1949 |